United States Patent
Hund et al.

(10) Patent No.: US 10,643,024 B2
(45) Date of Patent: May 5, 2020

(54) METHOD FOR CONVERTING A BINARY DATA STREAM

(71) Applicant: SIEMENS AKTIENGESELLSCHAFT, München (DE)

(72) Inventors: Johannes Hund, München (DE); Daniel Peintner, Meransen Mühlbach (IT)

(73) Assignee: Siemens Aktiengesellschaft, München (DE)

( * ) Notice: Subject to any disclaimer, the term of this patent is extended or adjusted under 35 U.S.C. 154(b) by 0 days.

(21) Appl. No.: 15/545,823

(22) PCT Filed: Jan. 26, 2015

(86) PCT No.: PCT/EP2015/051502
§ 371 (c)(1),
(2) Date: Jul. 24, 2017

(87) PCT Pub. No.: WO2016/119817
PCT Pub. Date: Aug. 4, 2016

(65) Prior Publication Data
US 2018/0004716 A1    Jan. 4, 2018

(51) Int. Cl.
*G06F 40/149*     (2020.01)
*G06F 40/14*     (2020.01)
(Continued)

(52) U.S. Cl.
CPC ............ *G06F 40/149* (2020.01); *G06F 40/14* (2020.01); *G06F 40/146* (2020.01)

(58) Field of Classification Search
CPC ............. G06F 17/2258; G06F 17/2247; G06F 17/2252; G06F 17/272; G06F 17/227;
(Continued)

(56) References Cited

U.S. PATENT DOCUMENTS

| 2005/0287948 A1 | 12/2005 | Hellwagner |
| 2010/0211867 A1 | 8/2010 | Heuer |
| 2014/0297692 A1* | 10/2014 | Doi ............ G06F 16/88 707/803 |

FOREIGN PATENT DOCUMENTS

| CN | 101807205 A | 8/2010 |
| CN | 101908070 A | 12/2010 |
| WO | WO2012171965 A1 | 12/2012 |

OTHER PUBLICATIONS

Efficient XML Interchange (EXI) Format 1.0, W3C Recommendation Feb. 2014, retrieved from https://www.w3.org/TR/exi/ on Jul. 18, 2018.*

(Continued)

*Primary Examiner* — Quoc A Tran
(74) *Attorney, Agent, or Firm* — Lempia Summerfield Katz LLC

(57) ABSTRACT

A method is provided for converting a binary data stream, (e.g., an EXI data stream). In an initialization phase of the method, a plurality of grammars, previously produced from at least one description language scheme, are read from a memory area and combined to form a combined grammar and wherein the combined grammar is supplied to a runtime environment for the purpose of converting the binary data stream. The method firstly permits substantially accelerated production of the desired grammar in comparison with a grammar produced as required from individual schemes, and secondly the memory space requirement may be kept down, because there is no need to keep a combinational variety of grammars available.

18 Claims, 1 Drawing Sheet

(51) Int. Cl.
*G06F 40/146* (2020.01)
*G06F 17/00* (2019.01)

(58) Field of Classification Search
CPC ........ G06F 8/30; G06F 40/149; G06F 40/146; G06F 40/14
See application file for complete search history.

(56) References Cited

OTHER PUBLICATIONS

Kyusakov R. et al.: "EXIP: A Framework for Embedded Web Development"; ACM Transactions on the Web (TWEB), ACM; New York; Bd. 8; Nr. 4; pp. 1-29; 2014.
Käbisch S. et al.: "Optimized XML-based Web Service Generation for Service Communication in Restricted Embedded Environments"; 16th IEEE International Conference on Emerging Technologies and Factory Automation; pp. 1-8; 2011.
PCT International Search Report and Written Opinion of the International Searching Authority dated Nov. 10, 2015 for corresponding PCT/EP2015/051502, with English translation.
Schneider J. et al.: "Efficient XML Interchange Format 1.0"; XP055220683; Gefunden im Internet: URL:http://www.w3.org/TR/exi/; 2014.
Yusuke Doi et al.: "XML-less EXI with code generation for integration of embedded devices in web based systems"; 3rd International Conference on the Internet of Things (IOT); pp. 76-83; 2012.
Chinese Office Action for Chinese Application No. 201580074577.X dated Nov. 26, 2019.

* cited by examiner

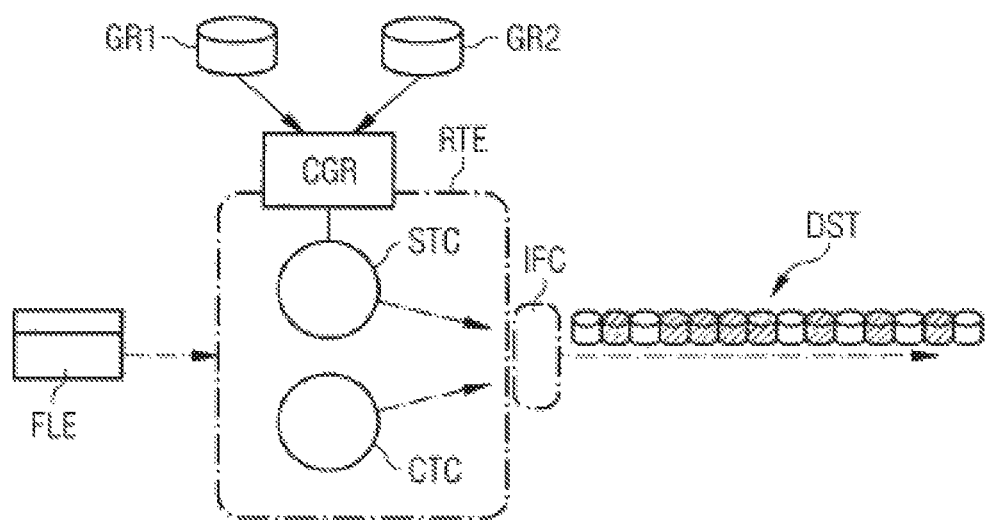

METHOD FOR CONVERTING A BINARY DATA STREAM

The present patent document is a § 371 nationalization of PCT Application Serial Number PCT/EP2015/051502, filed Jan. 26, 2015, designating the United States, which is hereby incorporated by reference.

TECHNICAL FIELD

The disclosure relates to a method for converting a binary data stream, e.g., an EXI data stream.

BACKGROUND

Description languages for specifying data formats and the methods needed for processing the data are known in the prior art. One known description language is "Extensible Markup Language", XML for short, which is used to describe hierarchically structured data in text form or "plain text". The description language XML is used for platform-independent interchange of data between computer systems. Owing to the textual nature of XML, the language may be read both by machines and by human beings. In addition, schemata are known that are used to describe a structure and to define data types. A schema for use for XML data is also known as an XML schema definition or XSD.

Efficient data interchange between computer systems is frequently necessary that cannot be achieved using a textual description language such as XML. Therefore, binary representations of XML have been proposed. A binary representation of XML referred to as "Efficient XML Interchange", EXI for short, is faster to process in comparison with text-based XML data and requires less transmission bandwidth for the data interchange between computer systems. Use of EXI is, moreover, not restricted solely to a binary representation of XML; EXI may be used as an interchange format for transmitting any semi-structured data.

The interchange format EXI particularly exhibits advantages when used in XML-based applications using a microcontroller having a limited supply of memory space and computation power. Devices that operate on the basis of microcontrollers, (for example, intelligent sensors on a production line or in a vehicle), may be set up for device-internal processing of data in a binary format and interchange these data with one another via appropriate communication interfaces, also, e.g., on the basis of binary data. In particular, binary data in accordance with EXI specifications allow inter-operability with XML-based systems in this case.

For the interchange format EXI too, use of schemata, (e.g., XML schema files), is advantageous. Use of schemata permits typed presentation of data being interchanged, also known as "typed data" among experts, which permits faster conversion of data into an internal representation at a receiver end. In addition, this measure permits an even more compact presentation, because knowledge already known at the receiver end, (such as, e.g., XML element names), may be transmitted no longer in a text format but rather by bilaterally known, short identifiers.

To further optimize a binary data stream that is to be transmitted in accordance with EXI, there is provision for schemata to be coded in grammars, also known as EXI grammars. In addition, a grammar also permits a coded representation or declaration of namespaces. For reasons of simplicity, the term "schemata" below covers both schemata in the sense of the preceding description and namespaces.

Coding of schemata in grammars is time-consuming and work-intensive. A further problem arises from the fact that currently established methods for converting and/or transmitting a binary EXI data stream frequently provide for multiple schemata to be used. In such cases, a combination of multiple schemata or schema files is required in order to code a grammar. In many such instances of application, the process is then unnecessarily performed repeatedly when multiple EXI data streams require like or similar combinations of schemata.

In one frequently arising case, according to which one schema from a multiplicity of schemata is subject to a change, the process of coding a grammar from the multiplicity of schemata, including unaltered schemata, needs to be repeated.

Several different combinations of schemata result in one grammar per combination each time. A technical need to keep grammars ready for different combinations of schemata on a persistent basis may currently be satisfied only by virtue of many variants of grammars being generated in advance. With an increasing number of schemata, the number of variants rises to an extreme degree on account of the great combinational diversity of possible combinations, which means that the memory space requirement for storing the grammars is accordingly high.

SUMMARY AND DESCRIPTION

The scope of the present disclosure is defined solely by the appended claims and is not affected to any degree by the statements within this description. The present embodiments may obviate one or more of the drawbacks or limitations in the related art.

The present disclosure is based on the object of providing one or more grammars corresponding to combinations of schemata associated with less involvement in terms of time and memory.

The object is achieved by a method that provides an initialization phase in a method for converting a binary data stream between a transmitter and a receiver, which initialization phase involves a plurality of grammars generated in advance being read from a memory area and said grammars being compiled to form a combined grammar.

A subsequent or simultaneously proceeding coding phase or runtime phase involves the combined grammar being used to convert binary data and/or text format data into a binary data stream or to convert a binary data stream into binary data and/or text format data. The first alternative may relate to a coding device, and the second alternative may relate to a decoding device.

Text format data are supplied to the runtime environment and text format data may be taken from the runtime environment in the form of description language schemata, for example, XML schema files, or data structures that are equivalent to XML.

Binary data are supplied to the runtime environment and binary data may be taken from the runtime environment in the form of memory representations, for example, using a format that is also known as document object model (DOM).

A memory representation is a presentation of the data described by a description language schema and transmittable by a binary data stream, which presentation is directly interchangeable with a program and may be processed. A coding device produces a serialized binary data stream from this memory representation, e.g., for the purpose of transmission. A decoding device converts a serialized binary data stream into a memory representation. The memory representation is then used for device-internal processing of the binary data.

The term "runtime" refers to the actual conversion of the binary data stream, the conversion being realized by a coding device or EXI encoder or by a decoding device or EXI decoder, for example. The coding device and the decoding device are alternatively combined in a single device, which may be referenced by the runtime environment.

There is provision for "atomic" grammars generated from one or more schemata to be stored on a persistent basis. When a combination so requires, the grammars needed may be loaded individually and processed in combination, just as if they were already available in combination.

The method allows individual schemata or a combination of individual schemata to be converted into the appropriate grammar representation in advance or in the event of changes. From each combination of these atomic grammars, the combined grammar needed in the instance of application is generated in a runtime environment as required. This measure firstly allows substantially accelerated generation of the desired grammar, and secondly it is possible for the memory space requirement to be kept down, because there is no need to keep a combinational variety of grammars available.

The object is additionally achieved by a computer program product executed in a coding device and/or decoding device that, on execution, performs the method.

The object is additionally achieved by a coding device and by a decoding device.

BRIEF DESCRIPTION OF THE DRAWINGS

Further exemplary embodiments and advantages of the disclosure are explained in more detail below with reference to the drawing.

FIG. 1 depicts an example of a schematic depiction of functional units of a coding device in which text format data of a description language that are supplied to the coding device are converted into a binary data stream.

DETAILED DESCRIPTION

As depicted in FIG. 1, the actual coding is effected in a unit referred to as a runtime environment RTE to which input data are supplied in file or text form. By way of example, input data in the form of an XML document FLE are supplied to the runtime environment RTE. Alternatively, memory representations or data structures equivalent to XML are supplied as input data.

Using a structure coding STC and a content coding CTC, a binary data stream DST is generated in the runtime environment RTE, which is transmitted to a receiver (not depicted) via an interface IFC of the coding device.

A plurality of atomic grammars GR1, GR2 generated from at least one description language schema in advance are read from a memory area (not depicted) and compiled to form a combined grammar CGR in an initialization phase. The combined grammar CGR is supplied to the runtime environment RTE via a nonstandardized interface, e.g., an EXI grammar interface. Depending on the combinational requirement, the grammars GR1, GR2 are loaded individually and, after being compiled, are processed as a combined grammar CGR, just as if a grammar were already available in combined form.

Structure coding STC and content coding CTC are used to process the input data FLE supplied to the runtime environment RTE to produce the binary data stream DST from the combined grammar CGR.

As is known to a person skilled in the art, a grammar is a coding and decoding instruction for an XML document, a data structure equivalent to XML, or a memory representation of an XML document, for example, as a document object model, DOM, of a coding device. A decoding device uses the grammar as an instruction to produce an XML document, a data structure equivalent to XML, or a memory representation of an XML document from a received data stream.

The functional units depicted in FIG. 1 may be present both in a coding device at a transmitter end and in a decoding device at a receiver end. At the receiver end, the binary data stream DST then forms the input data that are supplied via the interface IFC to the units for structure coding STC and content coding CTC to produce the structure and the content. The XML document, the memory representation, or the data structure equivalent to XML are then the output data from the receiver.

In accordance with one embodiment, the initialization phase described for the transmitter and linked to compiling the combined grammar may also be dispensed with at the receiver end, however. This is made possible in this embodiment by virtue of the grammar CGR required for the function of the transmitter and receiver being generated by the transmitter and then transmitted to the receiver in an initialization phase before the actual runtime of the data interchange. All of the information that the grammar CGR contains may be contained in a first, (e.g., characterized), data stream section that is transmitted from the transmitter to the receiver.

The text below explains the concept of a combined grammar based on an illustrative example. In this case, it is assumed that conversion of a binary data stream requires an XML schema having the file name "basket.xsd", where the file suffix "xsd" denotes an XML schema definition. In the basket schema, elements of further schemata, for example the schemata "apple.xsd", "pear.xsd", and "citrus.xsd", are used on a case-by-case basis.

Conversion of a binary data stream using previously known methods required the following grammars Gk, Gka, Gkb, . . . Gkabc to be generated and kept available using a grammar ( . . . ) call from a respective combination of schemata:

Gk=grammar (basket.xsd)
Gka=grammar (basket.xsd+apple.xsd)
Gkb=grammar (basket.xsd+pear.xsd)
Gkc=grammar (basket.xsd+citrus.xsd)
Gkab=grammar (basket.xsd+apple.xsd+pear.xsd)
Gkac=grammar (basket.xsd+apple.xsd+citrus.xsd)
Gkbc=grammar (basket.xsd+pear.xsd+citrus.xsd)
Gkabc=grammar (basket.xsd+apple.xsd+pear.xsd+citrus.xsd)

The grammars Gk, Gka, Gkb, . . . Gkabc denoted above either had to be produced from the respective schemata by an encoder or a decoder ad hoc, that is to say immediately before their respective use, or had to be generated in advance and buffer-stored in a memory area, particularly a cache memory, until they were used. While the first is disadvantageous on account of time-consuming and resource-involving ad-hoc generation, the second variant has the disadvantage that a high memory requirement is necessary for keeping all the grammars that may be required available. In addition, a change in one of the schemata requires all the grammars affected to be produced afresh.

In addition, entry of a further schema, for example "date.xsd", requires a grammar to be generated for every possible combination with this schema, and in the above example there would be entry of 18 additional combinations of possible schema combinations. This may entail a change in the schema basket.xsd, which means that new grammars have to be generated for all combinations of schemata, in that case 26 in the example above.

In certain examples, there is, by contrast, provision for a plurality of grammars already generated from a schema in advance to be compiled to form a combined grammar. Alternatively, these grammars already generated in advance may also have been generated from a plurality of schemata.

To keep available the grammars G'k, G'a, G'b, G'c already generated from a schema in advance, subsequently also referred to as an atomic grammar or atomic combinable grammar, an atomic_grammar ( ... ) call is used as follows:

G'k=atomic_grammar (basket.xsd)
G'a=atomic_grammar (apple.xsd)
G'b=atomic_grammar (pear.xsd)
G'c=atomic_grammar (citrus.xsd)

These atomic grammars permit substantially more efficient combination in a runtime environment to form a combined grammar than previously known generation of a grammar from a combination of schemata, which means that multiple atomic grammars may be compiled to form a combined grammar substantially more quickly in the runtime environment.

Even when a further schema is added as explained, it is merely necessary for every directly changed schema to be produced afresh as explained below using the example of an entering date schema:

G'd=atomic_grammar (date.xsd)

Only the atomic grammar G'k associated with the changed basket schema needs to be produced afresh in the course of this entry:

G'k=atomic_grammar (basket.xsd)

If the grammar Gkbc, which, according to conventional methods, would either have to be in the cache or would have to be generated, is now needed in the application, then it may be combined from the atomic grammars as a combined grammar, e.g., using a combine ( ... ) call:

Gkbc=combine(G'k+G'b+G'c)

The combined grammar is moreover identical at runtime to the conventionally generated grammar, e.g., the grammar generated and kept available from the combination of the basket, pear, and citrus schemata using a grammar ( ... ) call:

Gkbc=grammar(basket.xsd+pear.xsd+citrus.xsd)

For an implementation of the runtime environment in accordance with the rules of the EXI standard, the resultant combined grammar corresponds to a grammar that would also have emerged for a combination of different schemata in accordance with XML schema definition or XSD.

The prerequisite for combinability of atomic grammars that needs to be called for in accordance with a embodiment is that global elements of respective atomic grammars, e.g., those generated in advance, may be supplied to a combined list of global elements of the combined grammar.

In accordance with one embodiment, this is achieved, by way of example, by virtue of references to qualified names, which are referred to as QNames in the EXI vernacular, of elements of the individual atomic grammars being brought together in a list, that ultimately represents the combined grammar. A qualified name is a globally explicit descriptor that is compiled from the element name and a descriptor for the namespace. Specifically, a qualified name or QName may be compiled from what are known as Non-Colonized Names (NCNames), each of the NCNames apart from the last denoting a namespace. The last NCName corresponds to the local name within the namespace. The individual NCNames are compiled by dots (.) to form a QName.

In accordance with one embodiment, the combinability is supported by virtue of global elements of the combined list of global elements of the combined grammar referring to global elements of respective grammars generated in advance by virtue of indirectness. This means, by way of example, that a combined list of global elements with the length (e.g., length G1+length G2) is kept that indirectly refers to the existing lists. A list of references to the respective atomic grammars is thus created. This list may be set up in the initialization phase when different atomic grammars are combined.

In accordance with one embodiment, the combinability is supported by virtue of the initialization phase involving elements of respective fragmentary grammars generated in advance being supplied to a combined list of global elements of the combined grammar, wherein a match for a qualified name or "QName" in different elements prompts the matching qualified name to be created precisely once in the combined list of global elements, with name conflicts being resolved in accordance with a schema-informed grammar. This embodiment relates to elements of a "FragmentContent Grammar" in accordance with the EXI standard. The approach in this regard is inherently analogous to the global elements explained above. An exception thereto is formed only by definitions having identical QNames, which are compiled from the element name and a descriptor for the namespace. The aim of converting numerous elements having the same name into a single, explicit element in the combined grammar is achieved by resolving name conflicts analogously to the approach in a schema-informed grammar or "Schema-informed Element Fragment Grammar".

In accordance with one embodiment, the combinability is supported by virtue of the initialization phase involving type attributes of respective grammars generated in advance being supplied to a combined list of type attributes that is set up as required from a combination of grammars generated in advance and grammars containing type attributes. When a type attribute "xsi:type cast" appears, an EXI codec jumps to the referenced type "Grammar", if the latter is available. In the case of combined grammars, the list is set up afresh when first required by virtue of it setting up a combination of all type grammars (e.g., G1+G2+ ... ).

In accordance with one embodiment, the combinability is supported by virtue of the initialization phase involving at least one global element from the combined grammar with an applicable local name and/or an applicable namespace descriptor being used for wildcard expressions or wildcards. When wildcard expressions or wildcards appear, for example wildcards defined in EXI, (such as, e.g., AT(*), AT(uri, *), SE(*), SE(uri, *)), a grammar may use a list of all possible global elements and/or attributes as a possible comparison. In this case, an attempt is made to find a global element and/or attribute that matches the local name and a descriptor or Uniform Resource Identifier (URI) of the namespace in the list. In the case of multiple combined grammars, the combined list is accordingly searched.

In accordance with one embodiment, the combinability is supported by virtue of the initialization phase involving an extended substitution group, in which elements from different grammars generated in advance are assigned to one and the same substitution group, being formed for elements from substitution groups of different grammars generated in advance. In XML and EXI, an element may be substituted with all elements that belong to the same substitution group or "substitutionGroup". In the case of combined grammars, the substitution group or the list associated with the substitution group may need to be extended if elements from different grammars belong to the same substitutionGroup.

The disclosure relates, in summary, to a method for converting a binary data stream, (e.g., an EXI data stream), wherein an initialization phase involves a plurality of grammars generated from at least one description language schema in advance being read from a memory area and compiled to form a combined grammar and wherein the combined grammar is supplied to a runtime environment for the purpose of converting the binary data stream.

The disclosure firstly permits substantially accelerated generation of the desired grammar in comparison with a grammar generated as required from individual schemata, and secondly the memory space requirement may be kept down, because there is no need to keep a combinational variety of grammars available.

The disclosure provides increased flexibility by allowing new, possibly unforeseen, combinations without having to generate a new grammar for these combinations. Furthermore, faster updating is possible for changes in individual schemata, because only the atomic grammar affected rather than all combinations needs to be generated afresh.

In addition, the disclosure permits reduced management of metadata, because an atomic grammar may relate to just one schema rather than to a combination of schemata.

It is to be understood that the elements and features recited in the appended claims may be combined in different ways to produce new claims that likewise fall within the scope of the present disclosure. Thus, whereas the dependent claims appended below depend from only a single independent or dependent claim, it is to be understood that these dependent claims may, alternatively, be made to depend in the alternative from any preceding or following claim, whether independent or dependent, and that such new combinations are to be understood as forming a part of the present specification.

While the present disclosure has been described above by reference to various embodiments, it may be understood that many changes and modifications may be made to the described embodiments. It is therefore intended that the foregoing description be regarded as illustrative rather than limiting, and that it be understood that all equivalents and/or combinations of embodiments are intended to be included in this description.

The invention claimed is:

1. A method for converting a binary data stream, the method comprising:
generating a plurality of atomic grammars from a plurality of description language schema prior to an initialization phase, wherein each atomic grammar of the plurality of atomic grammars is generated from an individual description language schema of the plurality of description language schema;
storing the plurality of atomic grammars in a memory area;
forming a combined grammar in the initialization phase, the forming comprising reading a combination of atomic grammars of the plurality of atomic grammars from the memory area and compiling the combination of atomic grammars of the plurality of atomic grammars into the combined grammar, wherein the initialization phase involves type attributes of respective atomic grammars being supplied to a combined list of type attributes set up from the combination of atomic grammars; and
supplying the combined grammar to a runtime environment to convert the binary data stream.

2. The method of claim 1, wherein the conversion of the binary data stream comprises supplying binary data, text format data, or both the binary data and the text format data of a description language to the runtime environment.

3. The method of claim 2, wherein the initialization phase involves global elements of respective atomic grammars being supplied to a combined list of global elements of the combined grammar.

4. The method of claim 3, wherein the global elements of the combined list refer to global elements of respective atomic grammars by virtue of indirectness.

5. The method of claim 1, wherein the binary data stream is converted into binary data, text format data, or both the binary data and the text format data of a description language.

6. The method of claim 5, wherein the initialization phase involves global elements of respective atomic grammars being supplied to a combined list of global elements of the combined grammar.

7. The method of claim 6, wherein the global elements of the combined list refer to global elements of respective atomic grammars by virtue of indirectness.

8. The method of claim 1, wherein the initialization phase involves global elements of respective atomic grammars being supplied to a combined list of global elements of the combined grammar.

9. The method of claim 8, wherein the global elements of the combined list refer to global elements of respective atomic grammars by virtue of indirectness.

10. The method of claim 9, wherein the initialization phase involves at least one global element from the combined grammar with an applicable local name and/or an applicable namespace descriptor being used for wildcard expressions.

11. The method of claim 8, wherein the initialization phase involves at least one global element from the combined grammar with an applicable local name and/or an applicable namespace descriptor being used for wildcard expressions.

12. The method of claim 1, wherein the initialization phase involves elements of respective fragmentary atomic grammars being supplied to a combined list of global elements of the combined grammar,
wherein a match for a qualified name in different elements prompts the matching qualified name to be created precisely once in the combined list of global elements, and
wherein name conflicts are resolved in accordance with a schema-informed grammar.

13. The method of claim 12, wherein the initialization phase involves at least one global element from the combined grammar with an applicable local name and/or an applicable namespace descriptor being used for wildcard expressions.

14. The method of claim 1, wherein the initialization phase involves at least one global element from the combined grammar with an applicable local name and/or an applicable namespace descriptor being used for wildcard expressions.

15. The method of claim 1, wherein the initialization phase involves an extended substitution group, in which elements from different atomic grammars are assigned to one and the same substitution group, being formed for elements from substitution groups of different atomic grammars.

16. A computer program product having program code configured to, when the computer program product is executed on a coding device or decoding device, cause the coding device or decoding device to:

generate a plurality of atomic grammars from a plurality of description language schema prior to an initialization phase, wherein each atomic grammar of the plurality of atomic grammars is generated from an individual description language schema of the plurality of description language schema;

store the plurality of atomic grammars in a memory area;

form a combined grammar in the initialization phase, the forming comprising reading a combination of atomic grammars of the plurality of atomic grammars from the memory area and compiling the combination of atomic grammars into the combined grammar, wherein the initialization phase involves type attributes of respective atomic grammars being supplied to a combined list of type attributes set up from the combination of atomic grammars; and supply the combined grammar to a runtime environment to convert a binary data stream.

17. A coding device for converting a binary data stream, the coding device comprising:

a memory area configured to store a plurality of atomic grammars, wherein the plurality of atomic grammars is generated from a plurality of description language schema prior to an initialization phase, wherein each atomic grammar of the plurality of atomic grammars is generated from an individual description language schema of the plurality of description language schema;

an initialization unit configured to read a combination of atomic grammars of the plurality of atomic grammars from the memory area and compile the combination of atomic grammars to form a combined grammar in the initialization phase, wherein the initialization phase involves type attributes of respective atomic grammars being supplied to a combined list of type attributes set up from the combination of atomic grammars; and a runtime unit configured to convert binary data, text format data, or both the binary data and the text format data of a description language, which are supplied to the coding device, into a binary data stream by applying the combined grammar.

18. A decoding device for receiving a binary data stream, comprising:

a memory area configured to store a plurality of atomic grammars, wherein the plurality of atomic grammars is generated from a plurality of description language schema prior to an initialization phase, wherein each atomic grammar of the plurality of atomic grammars is generated from an individual description language schema of the plurality of description language schema;

an initialization unit configured to read a combination of atomic grammars of the plurality of atomic grammars from the memory area and compile the combination of atomic grammars to form a combined grammar in the initialization phase, wherein the initialization phase involves type attributes of respective atomic grammars being supplied to a combined list of type attributes set up from the combination of atomic grammars; and a runtime unit configured to convert a binary data stream supplied to the decoding device into binary data, text format data, or both the binary data and the text format data of a description language by applying the combined grammar.

* * * * *